United States Patent
Williams et al.

(10) Patent No.: US 9,400,499 B2
(45) Date of Patent: Jul. 26, 2016

(54) SYSTEMS AND METHODS FOR REAL-TIME QUANTUM COMPUTER-BASED CONTROL OF MOBILE SYSTEMS

(71) Applicant: D-Wave Systems Inc., Burnaby (CA)

(72) Inventors: Colin P. Williams, Half Moon Bay, CA (US); Jeremy P. Hilton, Burnaby (CA)

(73) Assignee: D-WAVE SYSTEMS INC., Burnaby (CA)

( * ) Notice: Subject to any disclaimer, the term of this patent is extended or adjusted under 35 U.S.C. 154(b) by 0 days.

(21) Appl. No.: 14/874,102

(22) Filed: Oct. 2, 2015

(65) Prior Publication Data

US 2016/0026183 A1 Jan. 28, 2016

Related U.S. Application Data

(63) Continuation of application No. 14/163,838, filed on Jan. 24, 2014, now Pat. No. 9,207,672.

(60) Provisional application No. 61/756,944, filed on Jan. 25, 2013.

(51) Int. Cl.
| | |
|---|---|
| *G01C 22/00* | (2006.01) |
| *G05D 1/00* | (2006.01) |
| *G06N 99/00* | (2010.01) |
| *B60W 10/00* | (2006.01) |
| *G06F 1/20* | (2006.01) |

(52) U.S. Cl.
CPC ............ *G05D 1/0088* (2013.01); *B60W 10/00* (2013.01); *G05D 1/00* (2013.01); *G06F 1/20* (2013.01); *G06N 99/002* (2013.01)

(58) Field of Classification Search
None
See application file for complete search history.

(56) References Cited

U.S. PATENT DOCUMENTS

| | | | |
|---|---|---|---|
| 5,334,181 A * | 8/1994 | Rubinsky | A61B 18/02 606/20 |
| 7,135,701 B2 | 11/2006 | Amin et al. | |
| 7,418,283 B2 | 8/2008 | Amin | |
| 7,533,068 B2 | 5/2009 | Maassen van den Brink et al. | |

(Continued)

FOREIGN PATENT DOCUMENTS

WO  2012/064974 A2   5/2012

OTHER PUBLICATIONS

Amin, "Effect of Local Minima on Adiabatic Quantum Optimization," *Physical Review Letters* 100(130503):1-4, 2008.

(Continued)

*Primary Examiner* — Adam Alharbi
(74) *Attorney, Agent, or Firm* — Seed IP Law Group PLLC

(57) ABSTRACT

Systems and methods for integrating quantum computing systems into mobile systems for the purpose of providing real-time, quantum computer-based control of the mobile systems are described. A mobile system includes a data extraction subsystem that extracts data from an external environment of the mobile system and a quantum computing subsystem that receives data from the data extraction subsystem and performs a quantum computing operation in real-time using the data from the data extraction subsystem. A result of the quantum computing operation influences a behavior of the mobile system, such as the navigation of the mobile system or an action performed by the mobile system. The on-board quantum computing subsystem includes on-board quantum computing infrastructure that is adapted to suit the needs and spatial constraints of the mobile system.

7 Claims, 3 Drawing Sheets

(56) References Cited

U.S. PATENT DOCUMENTS

| | | |
|---|---|---|
| 7,619,437 B2 | 11/2009 | Thom et al. |
| 7,639,035 B2 | 12/2009 | Berkley |
| 7,870,087 B2 | 1/2011 | Macready et al. |
| 7,876,248 B2 | 1/2011 | Berkley et al. |
| 7,898,282 B2 | 3/2011 | Harris et al. |
| 7,984,012 B2 | 7/2011 | Coury et al. |
| 8,008,942 B2 | 8/2011 | van den Brink et al. |
| 8,008,991 B2 | 8/2011 | Tcaciuc et al. |
| 8,035,540 B2 | 10/2011 | Berkley et al. |
| 8,159,313 B2 | 4/2012 | Uchaykin |
| 8,190,548 B2 | 5/2012 | Choi |
| 8,195,596 B2 | 6/2012 | Rose et al. |
| 8,279,022 B2 | 10/2012 | Thom et al. |
| 8,283,943 B2 | 10/2012 | van den Brink et al. |
| 8,382,301 B2 * | 2/2013 | Ehm ............ B82Y 10/00 359/850 |
| 2006/0290553 A1 | 12/2006 | Furuta et al. |
| 2009/0005026 A1 | 1/2009 | Lunsford et al. |
| 2009/0088924 A1 | 4/2009 | Coffee et al. |
| 2009/0158318 A1 | 6/2009 | Levy |
| 2010/0281885 A1 | 11/2010 | Black et al. |
| 2011/0022820 A1 | 1/2011 | Bunyk et al. |
| 2012/0135867 A1 | 5/2012 | Thom et al. |
| 2014/0187427 A1 | 7/2014 | Macready et al. |
| 2014/0214257 A1 | 7/2014 | Williams et al. |
| 2014/0337612 A1 * | 11/2014 | Williams ............ G06N 99/002 713/100 |

OTHER PUBLICATIONS

Petroff et al., "Systems and Methods for Cryogenic Refrigeration," U.S. Appl. No. 61/729,250, filed Nov. 21, 2012, 17 pages.

Petroff et al., "Systems and Methods for Cryogenic Refrigeration," U.S. Appl. No. 61/736,456, filed Dec. 12, 2012, 22 pages.

Williams et al., "Systems and Methods for Real-Time Quantum Computer-Based Control of Mobile Systems," Office Action mailed Oct. 15, 2014, for U.S. Appl. No. 14/163,838, 10 pages.

Williams et al., "Systems and Methods for Real-Time Quantum Computer-Based Control of Mobile Systems," Amendment filed Dec. 18, 2014, for U.S. Appl. No. 14/163,838, 9 pages.

Williams et al., "Systems and Methods for Real-Time Quantum Computer-Based Control of Mobile Systems," Office Action mailed Apr. 24, 2015, for U.S. Appl. No. 14/163,838, 10 pages.

Williams et al., "Systems and Methods for Real-Time Quantum Computer-Based Control of Mobile Systems," Amendment filed Jun. 23, 2015, for U.S. Appl. No. 14/163,838, 6 pages.

Williams et al., "Systems and Methods for Real-Time Quantum Computer-Based Control of Mobile Systems," Notice of Allowance mailed Jul. 2, 2015, for U.S. Appl. No. 14/163,838, 5 pages.

Williams, "Systems and Methods for Real-Time Quantum Computer-Based Control of Mobile Systems," U.S. Appl. No. 61/756,944, filed Jan. 25, 2013, 32 pages.

* cited by examiner

SYSTEMS AND METHODS FOR REAL-TIME QUANTUM COMPUTER-BASED CONTROL OF MOBILE SYSTEMS

BACKGROUND

Field

The present systems and methods generally relate to the integration of quantum computing systems into mobile systems for the purpose of providing real-time, quantum computer-based control of the mobile systems.

Mobile Systems

A mobile system is any system that is controllably movable via on-board structures or devices for propulsion and, in most cases, steering. Exemplary mobile systems include, but are not limited to: ground-based mobile systems such as automobiles, cars, trucks, buses, motorcycles, hovercraft, etc.; water-based mobile systems such as boats, ships, ferries, etc.; air-based mobile systems such as aircraft, planes, jets, helicopters, rockets, etc.; and space-based mobile systems such as satellites, rockets, etc., and/or other types of vehicles Thus, propulsion structures or devices may include, but are not limited to: engines, motors, wheels, propellers, turbines, rockets, and the like.

By virtue of its mobility, a mobile system is typically required to adapt and/or respond to features of its external environment. Such adaptations may be controlled by an on-board user, such as a driver or captain or pilot, a remote interface, or by an on-board automated and/or computerized control system. The state-of-the-art in automated control of mobile systems is limited by their ability to effectively process features of their external environment in real-time.

Quantum Computing Systems

A quantum computing system is any computing system that is designed to leverage at least one quantum mechanical phenomenon (such as superposition, entanglement, tunneling, etc.) in the processing of quantum information. Many different designs for quantum computing system hardware exist, including but not limited to: photonic quantum computing systems, superconducting quantum computing systems, nuclear magnetic resonance quantum computing systems, ion-trap quantum computing systems, topological quantum computing systems, quantum dot quantum computing systems, etc. Regardless of the specific hardware implementation, all quantum computing systems encode and manipulate quantum information in quantum mechanical objects or devices called quantum bits, or "qubits," all quantum computing systems employ structures or devices for communicating information between qubits, and all quantum computing systems employ structures or devices for reading out a state of at least one qubit. The physical form of the qubits dictates the hardware employed in the quantum computing system; e.g., photonic quantum computing systems employ photon-based qubits, superconducting quantum computing systems employ superconducting qubits, and so on.

Quantum computing systems may be architected to operate in a variety of different ways. For example, a quantum computing system may be architected as a general-purpose computing system or as a special-purpose computing system, and/or may be designed to perform gate/circuit based algorithms or adiabatic/annealing based algorithms. Exemplary systems and methods for quantum computing systems are described in, for example: U.S. Pat. No. 7,135,701, U.S. Pat. No. 7,418,283, U.S. Pat. No. 7,533,068, U.S. Pat. No. 7,619,437, U.S. Pat. No. 7,639,035, U.S. Pat. No. 7,898,282, U.S. Pat. No. 8,008,942, U.S. Pat. No. 8,190,548, U.S. Pat. No. 8,195,596, U.S. Pat. No. 8,283,943, and US Patent Application Publication 2011-0022820, each of which is incorporated herein by reference in its entirety.

BRIEF SUMMARY

A mobile system may be summarized as including a mobility subsystem that controllably propels and steers the mobile system; a data extraction subsystem that extracts data from an external environment of the mobile system; and a quantum computing subsystem that receives data from the data extraction subsystem and performs a quantum computing operation in real-time using the data from the data extraction subsystem, wherein a result of the quantum computing operation influences a behavior of the mobile system. The mobile system may further include a navigation subsystem that is communicatively coupled to both the quantum computing subsystem and the mobility subsystem, wherein the navigation subsystem may control the mobility subsystem, and wherein the result of the quantum computing operation may be used by the navigation subsystem to influence the mobility subsystem. The quantum computing operation performed by the quantum computing subsystem may include a real-time optimization of at least one parameter of the navigation subsystem based on data from the data extraction subsystem. The at least one parameter of the navigation subsystem may influence at least one of: a speed of the mobile system, a direction of the mobile system, a velocity of the mobile system, an acceleration of the mobile system, a trajectory of the mobile system, a travel route of the mobile system, a travel time of the mobile system, and a destination of the mobile system. The mobile system may include an action subsystem that is communicatively coupled to the quantum computing subsystem, wherein the action subsystem controllably causes the mobile system to perform an action, and wherein the result of the quantum computing operation may be used by the action subsystem to influence at least one parameter of the action performed by the mobile system. The at least one parameter of the action performed by the mobile system may include at least one of: a timing of the action, a duration of the action, a frequency of the action, a type of the action, a magnitude of the action, and a direction of the action.

The quantum computing subsystem may include a superconducting quantum processor; and an on-board cryogenic refrigeration system that is thermally coupled to the superconducting quantum processor. The on-board cryogenic refrigeration system may include at least one of: a bath of liquid cryogen, a pulse tube cryocooler, a Stirling cryocooler, a Gifford-McMahon cryocooler, a Joule-Thomson cryocooler, an adsorption refrigerator, a dilution refrigerator, and an adiabatic demagnetization refrigeration system. The on-board cryogenic refrigeration system may include a single-shot refrigeration system. The on-board cryogenic refrigeration system may be physically structured to accommodate a form factor of the mobile system.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 1 is a schematic diagram of an exemplary mobile system including an on-board quantum computing subsystem in accordance with the present systems and methods.

DETAILED DESCRIPTION

Figure 1:
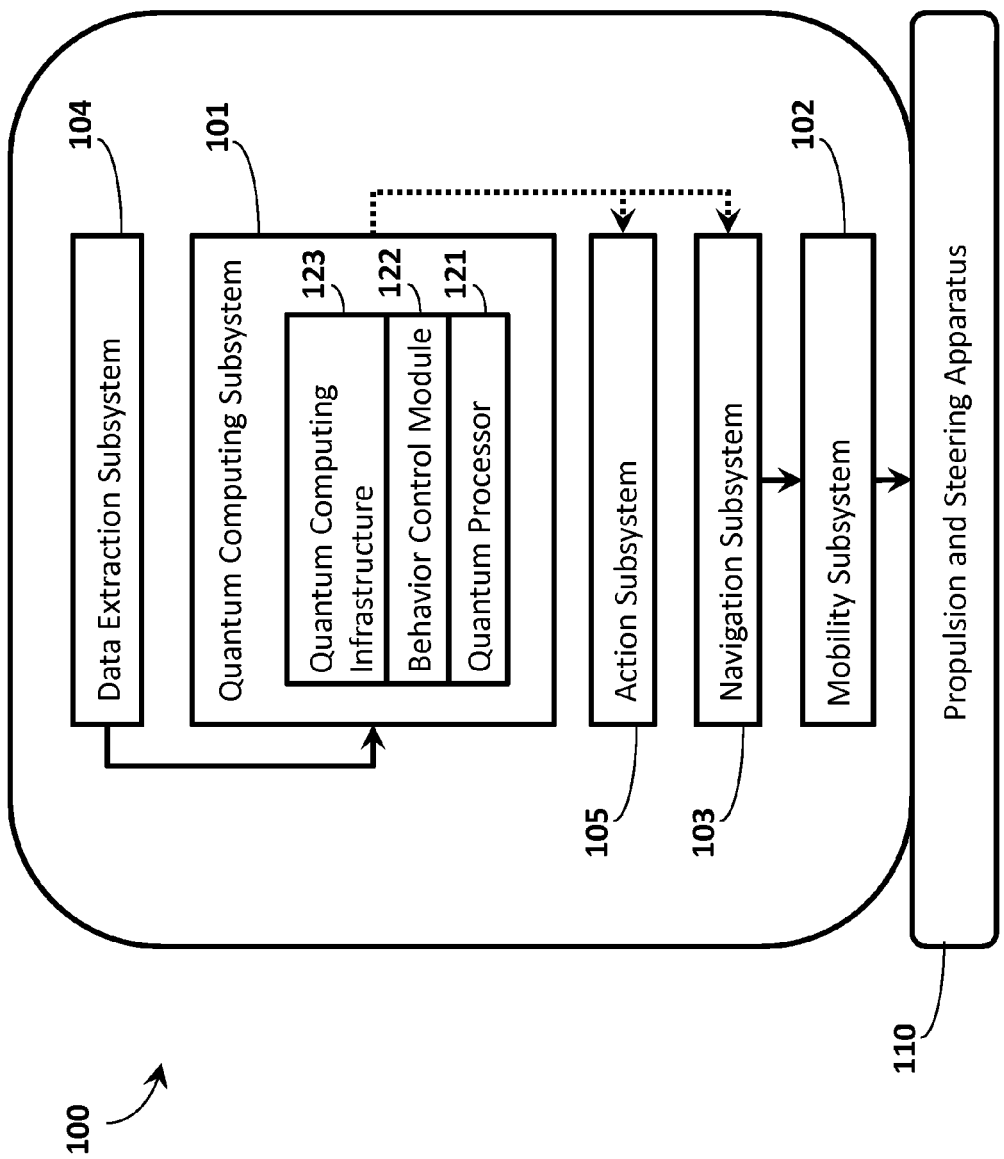

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors, drive circuitry and non-transitory computer- or processor-readable media such as nonvolatile memory for instance read only memory (ROM), electronically eraseable programmable ROM (EEPROM) or FLASH memory, etc., or volatile memory for instance static or dynamic random access memory (ROM) have not been shown or described in detail to avoid unnecessarily obscuring descriptions of the embodiments of the present systems and methods. Throughout this specification and the appended claims, the words "element" and "elements" are used to encompass, but are not limited to, all such structures, systems and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a quantum computing system including "a quantum processor" includes a single quantum processor, or two or more quantum processors, including a grid or distributed network of multiple quantum processors. It should also be noted that the term "or" is generally employed in its sense including "and/or" unless the content clearly dictates otherwise.

The headings provided herein are for convenience only and do not interpret the scope or meaning of the embodiments.

The various embodiments described herein provide systems and methods for real-time quantum computer-based control of mobile systems. For example, the various embodiments described herein provide systems and methods for integrating quantum computing systems into mobile systems for the purpose of providing real-time, quantum computer-based control of the mobile systems.

As described previously, a mobile system is typically required to adapt and/or respond to features of its external environment. Such adaptations may be controlled manually by a user (either on-board the mobile system or via a remote interface), or they may be controlled automatically via, for example, an on-board computerized system. In any case, adapting a behavior of a mobile system to the features of its external environment typically involves: a) the identification of the features of the external environment, b) an assessment, analysis or computation based on the features of the external environment, and c) an adjustment to a behavior of the mobile system based on the assessment, analysis or computation. An adjustment to a behavior of the mobile system may, for example, include an adjustment to the navigation of the mobile system (e.g., an adjustment to the speed, velocity, acceleration, direction, trajectory, travel time, travel route, destination, etc., of the mobile system) and/or an adjustment to an action performed by the mobile system (e.g., an adjustment to the timing, duration, frequency, type, magnitude, direction, etc., of the action). Multiple options for how to adjust a behavior of the mobile system always exist, thus adjusting a behavior of the mobile system based on a feature or features of its external environment inherently involves solving an optimization problem to determine the best (or at least, "good enough") adjustment(s) to make. The state-of-the-art in automated control of mobile systems is limited by the ability of digital computer systems to solve such optimization problems.

In accordance with the present systems and methods, quantum computing systems may be particularly well-suited to solve the optimization problems that arise in the automated control of mobile systems. In some instances, a remote-link between a mobile system and a quantum computing system may be sufficient to make use of the quantum computing system in optimizing various behaviors of the mobile system. However, a remote-link inherently necessitates signal transmission over relatively large distances and is therefore invariably subject to a time lag, and wireless communications are notoriously imperfect and unreliable. Time lags and signal losses can have devastating effects on the operation of a mobile system. For example, an automated navigation control subsystem that relies on a remote-link to an external optimization system (e.g., an external quantum computing system) may completely fail to respond to an obstacle in the path of the mobile system as a result of such a time lag or signal loss. A remote-link is therefore unacceptable as an interface for providing real-time behavior control for many mobile systems. In some instances, an external quantum computing system (i.e., a quantum computing system that is not on-board the mobile system) may be used to train an on-board artificial intelligence system (e.g., a classifier or set of classifiers), but such a trained artificial intelligence system is typically limited in the range of behaviors it can control.

In accordance with the present systems and methods, a quantum computing system may be adapted for integration into an on-board automated control system of a mobile system. The quantum computing system may be configured for continuous operation, or it may be configured to be called upon/activated only when necessary to solve a specific problem (e.g., an optimization problem) that the quantum computing system is particularly well-suited to solve. The quantum computing system may, for example, be configured as a disposable, single-shot system (i.e., a system having a short lifespan or active time) for performing a single or small number of computations (if identified as necessary by the mobile system) that govern a behavior of the mobile system. For example, a mobile system that is quickly approaching a complex navigation challenge may activate on-board quantum computing resources to determine an optimal (or at least, "good enough") path through the navigation challenge. Configuring the quantum computing system as a disposable, single-shot system has the advantage of relaxing a number of design specifications that are otherwise necessary to provide the continuous, long-term operation typically expected in the known quantum computing arts. Quantum computing systems typically require complex infrastructure in order to operate, and a considerable source of this complexity arises from the desire to provide long-term, continuous operation of the quantum computing system. For example, a superconducting quantum computing system requires an ultra-cold operating temperature provided by a sophisticated cryogenic refrigeration subsystem. The cryogenic refrigeration subsystem is typically designed to run continuously for an extended period of time (on the order of days, weeks, months, or even years) and this significantly augments the complexity of the cryogenic refrigeration subsystem. In accordance with the present systems and methods, the complexity of the cryogenic refrigeration subsystem of a superconducting quantum computing system may be greatly reduced if the quantum computing system is configured as a disposable, single-shot system (e.g., integrated into a mobile system) that only needs to be active/cold for on the order of seconds, minutes, or hours.

Throughout this specification, the term "on-board" is used to describe something (e.g., an object, a device, a system, a subsystem, a component, etc.) that is physically coupled to, and therefore moves with, a mobile system. For example, an on-board quantum computing subsystem is a quantum computing subsystem that is physically coupled to, and therefore moves with, a mobile system. An on-board subsystem is distinguished from an "external" subsystem, which is physically separated from, and therefore does not move with, a mobile system.

FIG. 1 is a schematic diagram of an exemplary mobile system 100 including an on-board quantum computing subsystem 101. Mobile system 100 includes propulsion and steering apparatus 110 controlled by a mobility subsystem 102. In other words, mobility subsystem 102 controllably propels and steers mobile system 100 via propulsion and steering apparatus 110. Some mobile systems may not include steering functionality, and as previously described propulsion apparatus may include, for example, an engine, a motor, a wheel or wheels, a propeller or propellers, a turbine or turbines, a rocket or rockets, and/or other known propulsion apparatus of mobile systems. Mobility subsystem 102 may include actuators and controllers for interfacing with and controlling the operation of propulsion and steering apparatus 110. As depicted in FIG. 1, mobility subsystem 102 is communicatively coupled to and controlled by a navigation subsystem 103; however, some mobile systems may not include a navigation subsystem. Navigation subsystem 103 may provide automated and/or computerized control of mobility subsystem 102 in order to direct/steer/guide (i.e., "navigate") the motion of mobile system 100. Thus, navigation subsystem 103 may include, for example, a digital computer system (see FIG. 3) and/or software stored in the non-transitory memory of a digital computer system which, when executed by the digital computer processor of the digital computer system, controls the operation of mobility subsystem 102. Navigation subsystem 103 may also include, for example, sensors and/or detection devices for monitoring the course of mobile system 100, including but not limited to: a compass, a speedometer, an accelerometer, an altimeter, a barometer, a velocitometer, etc. In accordance with the present systems and methods, navigation subsystem 103 may be communicatively coupled to, and at least partially controlled by, on-board quantum computing subsystem 101. Mobile system 100 also includes a data extraction subsystem 104 that extracts data from an external environment of mobile system 100. Data extraction subsystem 104 may include any structures or devices that extract data from or otherwise characterize aspects of the external environment of mobile system 100, including but not limited to: sensors, photon-detection structures or devices such as a camera or cameras, audio-detection structures or devices such as a microphone or microphones, and/or any other measurement or detection structures or devices such as barometers, altimeters, thermometers, magnetometers, accelerometers, speedometers, compasses, velocitometers, radiometers, particle detectors, distance measuring equipment (e.g., Light Detection and Randing (LIDAR)), other transducers, etc. Data extraction subsystem 104 may include at least one transducer that is responsive to at least one characteristic of the external environment of mobile system 100. Data extraction subsystem 104 may also include digital computer hardware and software (see, e.g., FIG. 3) for processing at least some of the data extracted from the external environment. For example, data extraction subsystem 104 may employ feature detection and/or feature extraction and/or feature selection techniques known in the arts of machine learning and artificial intelligence to extract information about specific features of the external environment of mobile system 100 and report information about these features via communicative coupling to quantum computing subsystem 101.

In accordance with the present systems and methods, on-board quantum computing subsystem 101 may receive data from data extraction subsystem 104 and perform a quantum computing operation in real-time using the data from data extraction subsystem 104. A result of the quantum computing operation may be used to influence a behavior of mobile system 100. For example, a result of the quantum computing operation may be used to influence the navigation of mobile system 100.

As previously described, mobile system 100 includes navigation subsystem 103 that is communicatively coupled to, and at least partially controlled by, quantum computing subsystem 101. In this configuration, a result of a quantum computing operation performed by quantum computing subsystem 101 using data from data extraction subsystem 104 may be used by navigation subsystem 103 to influence mobility subsystem 102. For example, the quantum computing operation performed by quantum computing subsystem 101 may include a real-time optimization of at least one parameter of navigation subsystem 103 based on data from data extraction subsystem 104. The at least one parameter of navigation subsystem 103 that is optimized may influence at least one of: a speed of mobile system 100, a direction of mobile system 100, a velocity of mobile system 100, an acceleration of mobile system 100, a trajectory of mobile system 100, a travel route of mobile system 100, a travel time of mobile system 100, a destination of mobile system 100, and/or any factor affecting the navigation of mobile system 100.

Throughout this specification, the term "real-time" is used to describe something (e.g., an operation, a process, a method, a technique, a computation, a calculation, an analysis, an optimization, etc.) that is performed using recently collected data to affect an imminent behavior. While in motion, the external environment of a mobile system (e.g., mobile system 100) is continuously changing. Thus, in the context of a mobile system, a real-time operation is an operation based on data extracted from the changing external environment of the mobile system that is used to influence a behavior of the mobile system within a short enough time span such that the influenced behavior of the mobile system is still relevant to the changing external environment. As would be appreciated by a person of skill in the art, many such real-time operations (e.g., an optimization in the navigation of a high-velocity mobile system based on features of its external environment) simply cannot accommodate the time lags and/or signal losses inherent to remote interface control, nor can they typically be timely managed by modern digital computer systems. In accordance with the present systems and methods, an on-board quantum computing subsystem may be employed to perform real-time optimizations of a mobile system's behavior based on features in its external environment more quickly, more reliably, and/or more accurately than an on-board digital computing system.

Either in addition to or instead of control of navigation subsystem 103, quantum computing subsystem 101 may be used to influence a non-navigation-related action performed by mobile system 100. As depicted in FIG. 1, mobile system 100 includes an action subsystem 105 that is communicatively coupled to quantum computing subsystem 101. Action subsystem 105 may controllably cause mobile system 100 to perform an action. Exemplary actions may include, but are not limited to: actuating an on-board mechanism or device, initiating an on-board operation or technique, performing a measurement or observation, deploying a subsystem or method, transmitting a signal, executing instructions, etc. With action subsystem 105 communicatively coupled to quantum computing subsystem 101, a result of the quantum computing operation performed by quantum computing subsystem 101 using data from data extraction subsystem 104 may be used by action subsystem 105 to influence at least one parameter of the action performed by mobile system 100. The at least one parameter of the action performed by mobile system 100 may include: a timing of the action, a duration of the action, a frequency of the action, a type of the action, a magnitude of the action, a direction of the action, and/or any factor affecting any action performed by mobile system 100.

A person of skill in the art will appreciate that FIG. 1 is an illustrative example of the components of a mobile system in accordance with the present systems and methods and many features and components of mobile system 100 are not shown and/or not drawn to scale. For example, FIG. 1 does not depict a representative geometry or form factor of mobile system 100 because such details are not relevant to the discussion of FIG. 1.

It may be advantageous to share resources between at least some subsystems of mobile system 100. For example, navigation subsystem 103 and data extraction subsystem 104 may share a sensor or detector, such as a speedometer; mobility subsystem 102 and action subsystem 105 may share an actuator; and/or any or all subsystems may share digital computing resources as described in more detail later.

As previously described, a quantum computing system, such as quantum computing subsystem 101 from FIG. 1, may be architected to operate in a variety of different ways using a variety of different hardware. For example, a quantum computing system may be architected to perform gate/circuit model quantum computation or adiabatic quantum computation/quantum annealing. Nevertheless, regardless of the type of quantum computing system employed, all quantum computing systems typically include: a quantum processor that leverages at least one quantum mechanical phenomenon (such as superposition, entanglement, tunneling, etc.) in the processing of quantum information; and quantum computing infrastructure that enables the operation of the quantum processor. Quantum computing subsystem 101 of FIG. 1 includes quantum processor 121 and quantum computing infrastructure 123. As discussed in more detail below, quantum processor 121 may include a superconducting quantum processor and quantum computing infrastructure 123 may include a cryogenic refrigeration subsystem and/or magnetic shielding subsystem that enable the operation of superconducting quantum processor 121. For example, a cryogenic refrigeration system may be thermally coupled to superconducting quantum processor 121. Quantum computing subsystem 101 also includes a behavior control module 122 that may interface with an on-board digital computer subsystem. An on-board digital computer system may be considered part of, or separate from, quantum computing subsystem 101 (e.g., part of, or separate from, quantum computing infrastructure 123) depending on the specific implementation.

In accordance with some embodiments of the present systems and methods, quantum processor 121 may be designed to perform adiabatic quantum computation and/or quantum annealing. A typical adiabatic evolution may be represented by equation 1:

$$H_e = (1-s)H_{In} + sH_f \tag{1}$$

where $H_{In}$ is the initial Hamiltonian, $H_f$ is the final or "problem" Hamiltonian, $H_e$ is the evolution or instantaneous Hamiltonian, and s is the evolution coefficient which controls the rate of evolution. In general, s may vary from 0 to 1 with time t as s(t). A common approach to adiabatic quantum computation ("AQC"), described, for example, in Amin, M. H. S., "Effect of local minima on quantum adiabatic optimization", PRL 100, 130503 (2008), is to start with an initial Hamiltonian of the form shown in equation 2:

$$H_{In} = -\frac{1}{2}\sum_{i=1}^{N}\Delta_i \sigma_i^x \tag{2}$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms. An initial Hamiltonian of this form may, for example, be evolved to a final Hamiltonian of the form:

$$H_f = -\frac{\varepsilon}{2}\left[\sum_{i=1}^{N} h_i \sigma_i^z + \sum_{i,j=1}^{N} J_{ij}\sigma_i^z\sigma_j^z\right] \tag{2}$$

where N represents the number of qubits, $\sigma_i^z$ is the Pauli z-matrix for the $i^{th}$ qubit, $h_i$ and $J_{i,j}$ are dimensionless local fields coupled into each qubit, and $\varepsilon$ is some characteristic energy scale for $H_f$. Here, the $\sigma_i^z$ and $\sigma_i^z\sigma_j^z$ terms are examples of "diagonal" terms. Throughout this specification, the terms "final Hamiltonian" and "problem Hamiltonian" are used interchangeably. Hamiltonians such as $H_{In}$ and $H_f$ in equations 2 and 3, respectively, may be physically realized in a variety of different ways. A particular example is realized by an implementation of superconducting qubits.

Figure 2:
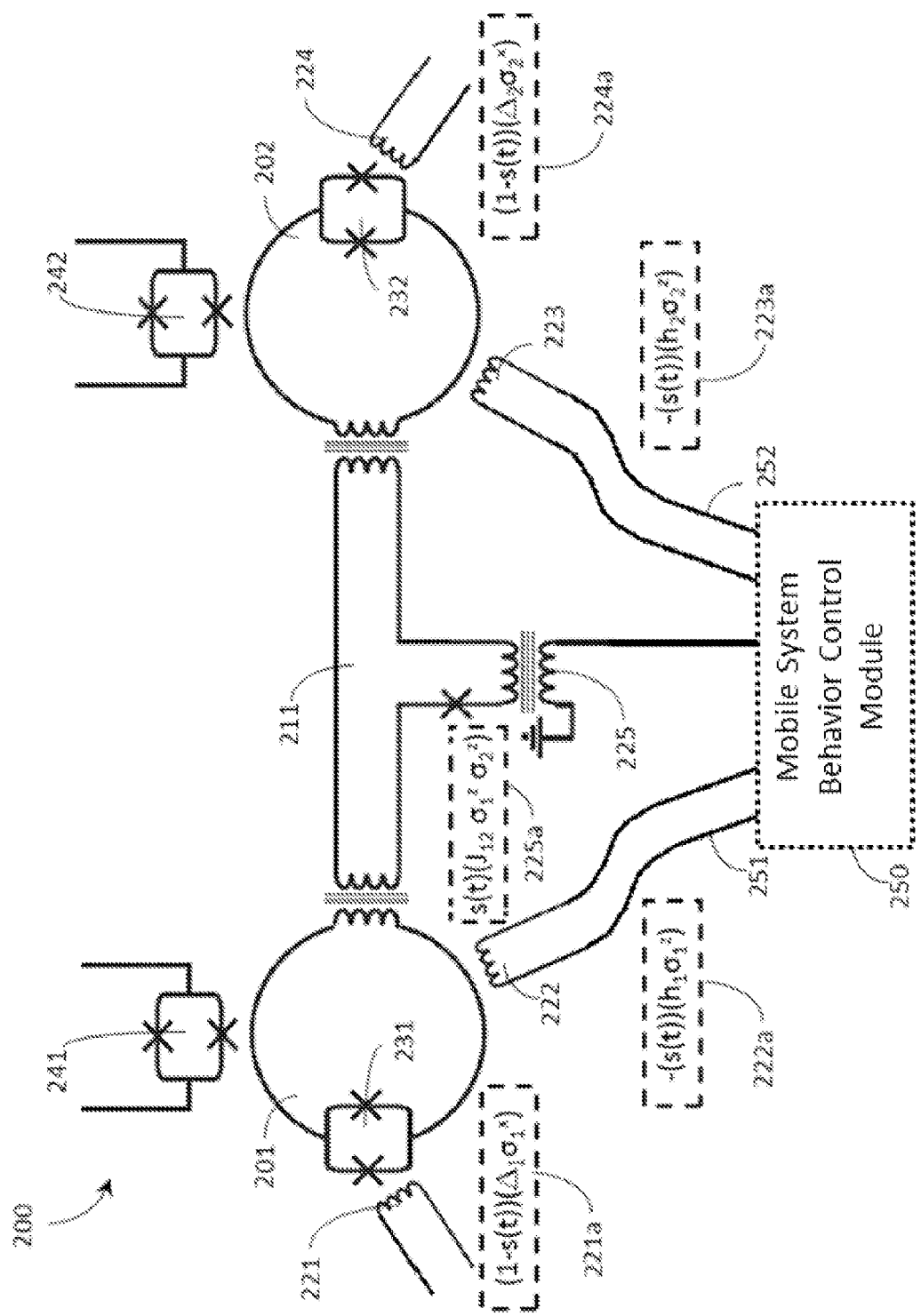
FIG. 2 is a schematic diagram of a portion of an exemplary superconducting quantum processor designed for adiabatic quantum computation (and/or quantum annealing) that may be used in conjunction with the present systems and methods.

FIG. 2 is a schematic diagram of a portion of an exemplary superconducting quantum processor 200 designed for AQC (and/or quantum annealing) that may be used in conjunction with the present systems and methods (i.e, as quantum processor 121 in FIG. 1). The portion of superconducting quantum processor 200 shown in FIG. 2 includes two superconducting qubits 201, 202 and a tunable ZZ-coupler 211 coupling information therebetween (i.e., providing pair-wise coupling between qubits 201 and 202). While the portion of quantum processor 200 shown in FIG. 2 includes only two qubits 201, 202 and one coupler 211, those of skill in the art will appreciate that quantum processor 200 may include any number of qubits and any number of coupling devices coupling information therebetween.

The portion of quantum processor 200 shown in FIG. 2 may be implemented to physically realize AQC and/or QA by initializing the system with the Hamiltonian described by equation 2 and evolving the system to the Hamiltonian described by equation 3 in accordance with the evolution described by equation 1. Quantum processor 200 includes a plurality of interfaces 221-225 that are used to configure and control the state of quantum processor 200. Each of interfaces 221-225 may be realized by a respective inductive coupling structure, as illustrated, as part of a programming subsystem and/or an evolution subsystem. Such a programming subsystem and/or evolution subsystem may be separate from quantum processor 200, or it may be included locally (i.e., on-chip with quantum processor 200) as described in, for example, U.S. Pat. No. 7,876,248 and U.S. Pat. No. 8,035,540.

In the operation of quantum processor 200, interfaces 221 and 224 may each be used to couple a flux signal into a respective compound Josephson junction 231, 232 of qubits 201 and 202, thereby realizing the $\Delta_i$ terms in the system Hamiltonian. This coupling provides the off-diagonal $\sigma^x$ terms of the Hamiltonian described by equation 2 and these flux signals are examples of "disordering signals." Similarly, interfaces 222 and 223 may each be used to couple a flux signal into a respective qubit loop of qubits 201 and 202, thereby realizing the $h_i$ terms in the system Hamiltonian. This coupling provides the diagonal $\sigma^z$ terms of equation 3. Furthermore, interface 225 may be used to couple a flux signal into coupler 211, thereby realizing the $J_{ij}$ term(s) in the system Hamiltonian. This coupling provides the diagonal $\sigma^z_i \sigma^z_j$ terms of equation 3. In FIG. 2, the contribution of each of interfaces 221-225 to the system Hamiltonian is indicated in boxes 221a-225a, respectively. Thus, throughout this specification and the appended claims, the terms "problem formulation" and "configuration of a number of programmable parameters" are used to refer to, for example, a specific assignment of $h_i$ and $J_{ij}$ terms in the system Hamiltonian of a superconducting quantum processor via, for example, interfaces 221-225.

Throughout this specification, the term "quantum processor" is used to generally describe a collection of physical qubits (e.g., qubits 201 and 202) and couplings therebetween (e.g., coupler 211). The physical qubits 201 and 202 and the couplers 211 are referred to as the "programmable elements" of the quantum processor 200 and their corresponding parameters (e.g., the qubit $h_i$ values and the coupler $J_{ij}$ values) are referred to as the "programmable parameters" of the quantum processor. In the context of a quantum processor, the term "programming subsystem" is used to generally describe the interfaces (e.g., "programming interfaces" 222, 223, and 225) used to apply the programmable parameters (e.g., the $h_i$ and $J_{ij}$ terms) to the programmable elements of the quantum processor 200 and other associated control circuitry and/or instructions. As previously described, the programming interfaces of the programming subsystem may communicate with other subsystems which may be separate from the quantum processor or may be included locally on the processor. As described in more detail later, the programming subsystem may be configured to map candidate investments to the qubits of the quantum processor such that each candidate investment corresponds to at least one qubit in the quantum processor, and to map correlations between respective pairs of the candidate investments to the coupling devices of the quantum processor such that each correlation corresponds to at least one coupling device in the quantum processor. As illustrated in FIG. 2, programming interfaces 222, 223, and 225 of the programming subsystem of quantum processor 200 may be communicatively coupled, via communication conduits 251 and 252, to mobile system behavior control module 250. At least a respective portion of each of communication conduits 251 and 252 may be included "on-chip" (e.g., as superconducting lines or traces) in quantum processor 200. Exemplary characteristics of mobile system behavior control module 250 are discussed in detail later. Similarly, in the context of a quantum processor, the term "evolution subsystem" is used to generally describe the interfaces (e.g., "evolution interfaces" 221 and 224) used to evolve the programmable elements of the quantum processor 200 and other associated control circuitry and/or instructions. For example, the evolution subsystem may include annealing signal lines and their corresponding interfaces (221, 224) to the qubits (201, 202).

Quantum processor 200 also includes readout devices 241 and 242, where readout device 241 is configured to read out the state of qubit 201 and readout device 242 is configured to read out the state of qubit 202. In the embodiment shown in FIG. 2, each of readout devices 241 and 242 comprises a respective DC-SQUID that is configured to inductively couple to the corresponding qubit (qubits 201 and 202, respectively). In the context of quantum processor 200, the term "readout subsystem" is used to generally describe the readout devices 241, 242 used to read out the final states of the qubits (e.g., qubits 201 and 202) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in PCT Patent Publication WO/2012/064974.

While FIG. 2 illustrates only two physical qubits 201, 202, one coupler 211, and two readout devices 241, 242, a quantum processor (e.g., processor 200) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

Quantum processor 200 from FIG. 2 embodies an example of an adiabatic quantum computing/quantum annealing system that intrinsically optimizes equation 3 by evolving a quantum mechanical system to determine a configuration of spin devices (i.e., qubits) that minimizes the energy of equation 3. Quantum processor 200 naturally evolves towards this minimum energy configuration because the lowest energy configuration is, typically, the most stable configuration of the system. Because quantum processor 200 inherently performs optimization in its natural evolution, quantum processor 200 is particularly well-suited to solve optimization problems that may be mapped to equation 3, such as the optimization problems encountered in the automated control of mobile systems. Exemplary systems and methods for mapping optimization problems to a Hamiltonian such as equation 3 are described in at least: U.S. Pat. No. 7,418,283, U.S.

Pat. No. 7,533,068, U.S. Pat. No. 7,870,087, U.S. Pat. No. 7,984,012, U.S. Pat. No. 8,190,548, U.S. Pat. No. 8,195,596, and U.S. patent application Ser. No. 13/806,404.

As previously described, quantum computing subsystem 101 of mobile system 100 from FIG. 1 may include a behavior control module 122, at least a portion of which is represented in quantum processor 200 from FIG. 2 as mobile system behavior control module 250. Behavior control module 122/250 may provide an interface between quantum processor 121/200 and an on-board digital computer system. For example, a mobile system (such as mobile system 100) may include an on-board digital computer system for calibrating, controlling, and generally interfacing with/between any or all of the on-board subsystems, including but not limited to quantum computing subsystem 101, mobility subsystem 102, navigation subsystem 103, data extraction subsystem 104, and/or action subsystem 105. For the purposes of the present systems and methods, any or all of the above subsystems in mobile system 100 may include and/or be communicatively coupled to an on-board digital computer system, which is/are not depicted in FIG. 1 to reduce clutter.

Although various aspects of the present systems and methods are described as involving "a digital computer system" and successive acts may be described as performed via "the digital computer system," a person of skill in the art will appreciate that the present systems and methods may employ any number of digital computers (i.e., one or more digital computers) and successive acts (i.e., digital processing tasks) in any method may be performed on the same digital computer or on different digital computers (either in series or in parallel) that are in communication with one another, for example using conventional microprocessors.

Figure 3:
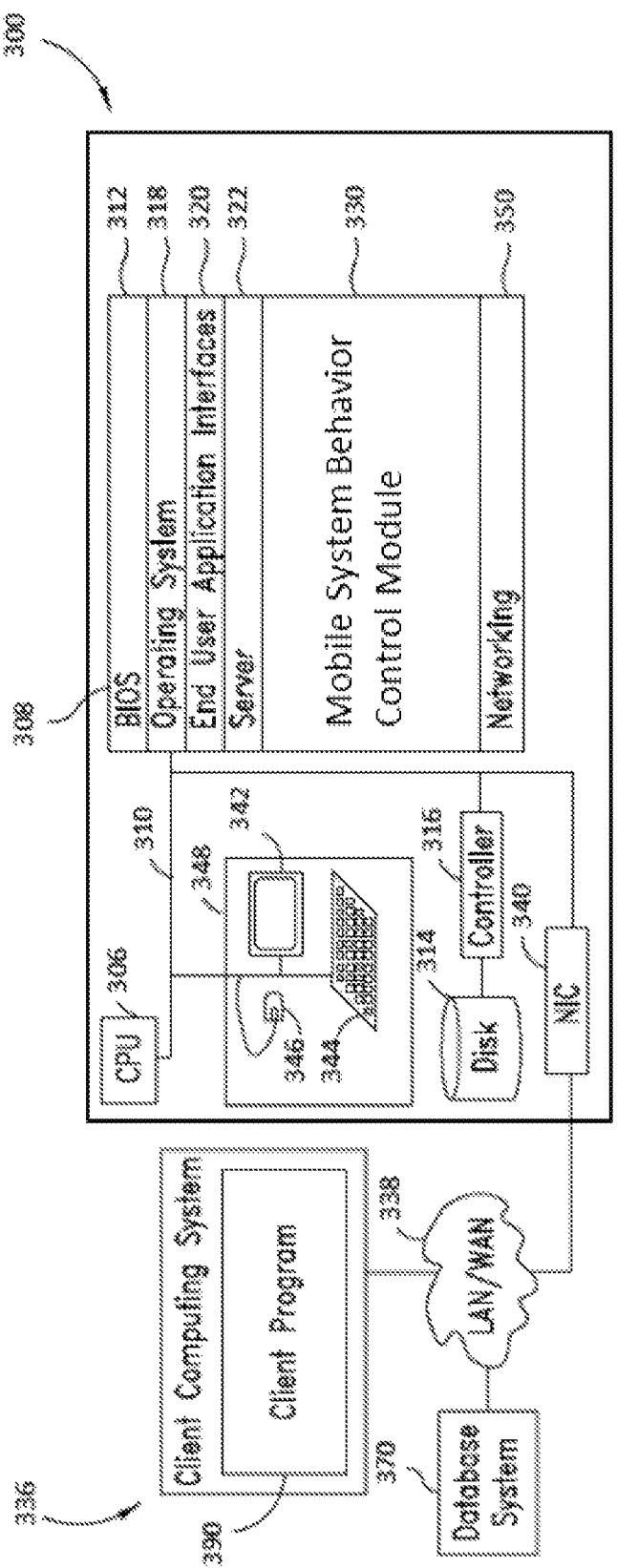
FIG. 3 illustrates an exemplary digital computer system including a digital computer processor that may be used to perform digital processing tasks described in the present systems and methods.

FIG. 3 illustrates an exemplary digital computer system 300 including a digital computer processor 306 that may be used to perform classical digital processing tasks described in the present systems and methods. Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like. The present systems and methods can also be practiced in distributed computing environments, where tasks or modules are performed by remote processing devices, which are linked through a communications network. In a distributed computing environment, program modules may be located in both local and remote memory storage devices.

Digital computer system 300 may include at least one processing unit 306 (i.e., digital computer processor), at least one system memory 308, and at least one system bus 310 that couples various system components, including system memory 308 to digital computer processor 306. Digital computer system 300 will at times be referred to in the singular herein, but this is not intended to limit the application to a single digital computer system 300. For example, there may be more than one digital computer system 300 or other classical computing device involved throughout the present systems and methods.

Digital computer processor 306 may be any logic processing unit, such as one or more central processing units ("CPUs"), digital signal processors ("DSPs"), application-specific integrated circuits ("ASICs"), etc. Unless described otherwise, the construction and operation of the various blocks shown in FIG. 3 are of conventional design. As a result, such blocks need not be described in further detail herein, as they will be understood by those skilled in the relevant art.

System bus 310 can employ any known bus structures or architectures, including a memory bus with a memory controller, a peripheral bus, and a local bus. System memory 308 may include non-transitory memory and/or non-volatile memory such as read-only memory ("ROM") and/or volatile memory such as random access memory ("RAM") (not shown). A basic input/output system ("BIOS") 312, which can form part of the ROM, contains basic routines that help transfer information between elements within digital computer system 300, such as during startup.

Digital computer system 300 may also include other non-volatile memory 314. Non-volatile memory 314 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 314 may communicate with digital computer processor 306 via system bus 310 and may include appropriate interfaces or controllers 316 coupled between non-volatile memory 314 and system bus 310. Non-volatile memory 314 may serve as long-term storage for computer-readable instructions, data structures, program modules and other data for digital computer system 300. Although digital computer system 300 has been described as employing hard disks, optical disks and/or magnetic disks, those skilled in the relevant art will appreciate that other types of non-volatile computer-readable media may be employed, such a magnetic cassettes, flash memory cards, Bernoulli cartridges, Flash, ROMs, smart cards, etc.

Various program modules, application programs and/or data can be stored in system memory 308. For example, system memory 308 may store an operating system 318, end user application interfaces 320 and server applications 322. In accordance with the present systems and methods, system memory 308 may store a mobile system behavior control module 330 that stores and executes (via digital processor 306) instructions for interacting with a quantum processor (e.g., quantum processor 200 from FIG. 2 or quantum processor 121 form FIG. 1) to perform a real-time computation that influences a behavior of a mobile system as described herein. Mobile system behavior control module 330 may interface with the programming subsystem of a quantum processor as illustrated in FIG. 2.

System memory 308 may also include one or more networking applications 350, for example, a Web server application and/or Web client or browser application for permitting digital computer system 300 to exchange data with sources via the Internet, corporate Intranets, or other networks, as well as with other server applications executing on server computers. Networking application 350 in the depicted embodiment may be markup language based, such as hypertext markup language ("HTML"), extensible hypertext markup language ("XHTML"), extensible markup language ("XML") or wireless markup language ("WML"), and may operate with markup languages that use syntactically delimited characters added to the data of a document to represent the structure of the document. A number of Web server applications and Web client or browser applications are commercially available, such as those available from Mozilla and Microsoft.

While shown in FIG. 3 as being stored in system memory 308, operating system 318 and various applications/modules 320, 322, 330, 350 and other data can also be stored in nonvolatile memory 314.

Digital computer system 300 may operate in a networking environment using logical connections to at least one client computer system 336 and at least one database system 370. These logical connections may be formed using any means of digital communication, for example, through a network 338, such as a local area network ("LAN") or a wide area network ("WAN") including, for example, the Internet. The networking environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computer system 300 may be connected to the LAN through an adapter or network interface card ("NIC") 340 (communicatively linked to system bus 310). When used in a WAN networking environment, digital computer system 300 may include an interface and modem (not shown), or a device such as NIC 340, for establishing communications over the WAN. Non-networked communications may additionally, or alternatively be employed.

In a networked environment, program modules, application programs, data, or portions thereof can be stored outside of digital computer system 300. Those skilled in the relevant art will recognize that the logical connections shown in FIG. 3 are only some examples of establishing communications between computers, and other connections may also be used.

While digital computer system 300 may generally operate automatically, an end user application interface 320 may also be provided such that an operator can interact with digital computer system 300 through different user interfaces 348, including output devices, such as a monitor 342, and input devices, such as a keyboard 344 and a pointing device (e.g., mouse 346). Monitor 342 may be coupled to system bus 310 via a video interface, such as a video adapter (not shown). Digital computer system 300 can also include other output devices, such as speakers, printers, etc. Other input devices can also be used, including a microphone, joystick, scanner, etc. These input devices may be coupled to digital computer processor 306 via a serial port interface that couples to system bus 310, a parallel port, a game port, a wireless interface, a universal serial bus ("USB") interface, or via other interfaces.

NIC 340 may include appropriate hardware and/or software for interfacing with the elements of a quantum processor (not shown). In other embodiments, different hardware may be used to facilitate communications between digital computer system 300 and a quantum processor. For example, digital computer system 300 may communicate with a quantum processor via a direct electrical connection (e.g., via Universal Serial Bus, Firewire, or the like), a wireless connection (e.g., via a Wi-Fi® network), or an Internet connection.

Client computer system 336 may comprise any of a variety of computing devices communicatively coupled to digital computer system 300, and may include a client program 390 configured to properly format and send information directly or indirectly to server application 322. Server application 322 may be configured to send information back to client program 390.

As previously described, quantum computing systems are typically designed to run continuously for an extended period of time (on the order of days, weeks, months, or even years) and this significantly augments their complexity. For example, some forms of quantum computing systems (e.g., superconducting quantum computing systems) require an ultra-cold operating temperature provided by a cryogenic refrigeration subsystem, and the typical desire for long-term, continuous operation significantly augments the complexity of such subsystems. In accordance with the present systems and methods, the complexity of a quantum computing system may be greatly reduced if the quantum computing system is configured as a disposable, single-shot system (e.g., integrated into a mobile system) that only needs to be active/cold for on the order of seconds, minutes, or hours.

Many systems and methods exist for producing and sustaining cryogenic temperatures. Exemplary systems include wet baths of liquid cryogens (e.g., liquid nitrogen, liquid helium, etc.), pulse tube cryocoolers, Stirling cryocoolers, Gifford-McMahon cryocoolers, Joule-Thomson cryocoolers, adsorption refrigerators, dilution refrigerators, adiabatic demagnetization refrigerators, etc. Further exemplary cryogenic systems and methods are described in US Patent Application Publication 2010-0281885, U.S. Provisional Patent Application Ser. No. 61/729,250, and U.S. Provisional Patent Application Ser. No. 61/736,456, each of which is incorporated herein by reference in its entirety. In accordance with the present systems and methods, any of these known cryogenic refrigeration systems may be adapted, either individually or in combination, for use on board a mobile system for the purpose of cooling an on-board quantum computing subsystem. For example, in the case of a disposable single-shot quantum computing subsystem, any of the above cryogenic refrigeration systems may be simplified by eliminating the need for long-term, continuous operation and designing the refrigeration system itself as a single-shot system.

In accordance with the present systems and methods, a mobile system such as mobile system 100 from FIG. 1 may dock with another system, hereafter referred to as a "dock system." A dock system may be stationary or may itself be a mobile system. A dock system may house some infrastructure employed by the quantum computing subsystem of the mobile system. For example, a dock system may house a large cryogenic refrigeration system designed to provide long-term, continuous cryogenic refrigeration. While the mobile system is docked with the dock system, the continuous cryogenic refrigeration system of the dock system may be thermally coupled to the quantum computing subsystem (i.e., to at least the quantum processor of the quantum computing subsystem) of the mobile system such that the quantum computing subsystem of the mobile system is continuously cooled by the cryogenic refrigeration system of the dock system. When the mobile system is "deployed" or "disengaged" from the dock system, a smaller, single-shot cryogenic refrigeration system that is on board the mobile system (i.e., that is part of quantum computing infrastructure 123 of quantum computing subsystem 101) may be activated to keep the on-board quantum computing subsystem operational (i.e., "cold") for a sufficient amount of time to complete the task or action for which the mobile system has been deployed. In this example, the single-shot cryogenic refrigeration system that is on board the mobile system may be significantly simpler in design and operation than the long-term, continuous cryogenic refrigeration system housed by the dock system. For example, the single-shot cryogenic refrigeration system may have relatively low cooling power compared to the long-term cryogenic refrigeration system; and/or may employ only a single stage (or fewer than all stages) of what is typically a multi-stage cryogenic refrigeration system; and/or in the case of a dilution refrigerator, may be adapted to employ only closed circuit flow of liquid helium and so omit at least some of the pumps, compressors, etc., typically required in dilution refrigeration systems; and/or in the case of an adiabatic demagnetization refrigerator, may be adapted to employ a shunt resistance in the superconducting magnet circuit. The design of the single-shot refrigeration system on board the mobile system may also be adapted so that its physical structure accommodates a form factor of the mobile system.

In some applications, it may be particularly advantageous to implement an adiabatic demagnetization refrigerator in the on-board cryogenic refrigeration system of the on-board quantum computing subsystem, at least in part because an adiabatic demagnetization refrigerator employs a large superconducting magnet which itself stores a significant amount of power. Electrical power may be drawn from the superconducting magnet of an on-board adiabatic demagnetization refrigerator in order to at least partially power, or provide back-up power for, some other subsystems or components of the mobile system. Similarly, magnetic power may be drawn from the superconducting magnet of an on-board adiabatic demagnetization refrigerator in order to contribute magnet forces to propulsion apparatus, such as motors, magnetic ion thrusters, etc. In accordance with the present systems and methods, at least some of the power stored in the superconducting magnet of an on-board adiabatic demagnetization refrigerator may be used to power other systems, subsystems, and/or components on board the mobile system.

In addition to modifications/simplifications to the on-board cryogenic refrigeration system of an on-board quantum computing subsystem, the on-board electrical input/output system of the on-board quantum computing subsystem may also be adapted for use in a single-shot, mobile application. Exemplary input/output systems that may be used and/or adapted for use in the present systems and methods are described in, for example, US Patent Application Publication 2012-0135867, U.S. Pat. No. 8,008,991, U.S. Pat. No. 8,159,313, and U.S. Pat. No. 8,279,022, each of which is incorporated herein by reference in its entirety. The nature of the single-shot, mobile mode of use described in the present systems and methods is such that the quantum computing subsystem may be specialized to perform certain specific tasks that are otherwise a subset of its general functionality. This specialization may allow for simplifications in the input/output system of the quantum computing subsystem, which in turn may allow simplifications in the cryogenic refrigeration system. For example, the number of communication lines in the electrical input/output system of the quantum computing subsystem may be reduced to include only those lines necessary to perform the specific computation that the quantum computing subsystem is designed to perform. This reduction in the number of lines in the input/output system may reduce the total thermal load (i.e., by reducing the total mass of matter being cooled) on the cryogenic refrigeration system and thus reduce the overall demand on the cooling power of the cryogenic refrigeration system. Other modifications to the input/output system may include, but are not limited to: configuring at least some electrical filters to be cooled by a warmer temperature stage of the cryogenic refrigeration system (i.e., by thermally decoupling the filters form the coldest stage of the cryogenic refrigeration system and thermally coupling the filters to a warmer stage of the cryogenic refrigeration system) to reduce the total thermal load on the coldest stage of the cryogenic refrigeration system, reducing mass of structural and/or thermalizing components, and/or converting at least some communication lines to optical lines.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems and methods of quantum computation, not necessarily the exemplary methods for quantum computation generally described above.

The various embodiments described above can be combined to provide further embodiments. All of the U.S. patents, U.S. patent application publications, U.S. patent applications, International (PCT) patent applications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. All of the commonly assigned US patent application publications, US patent applications, foreign patents, foreign patent applications and non-patent publications referred to in this specification and/or listed in the Application Data Sheet, including but not limited to U.S. application Ser. No. 14/163,838 filed Jan. 24, 2014 and U.S. Provisional Application Ser. No. 61/756,944 filed Jan. 25, 2013 are incorporated herein by reference, in their entirety.

The invention claimed is:

1. A system comprising:
   a dock system comprising:
      a dock; and
      a first cryogenic refrigeration system,
   a mobile system removably physically coupleable to the dock, the mobile system comprising a second cryogenic refrigeration system, wherein the mobile system further comprises at least one quantum computing subsystem, mechanically coupled to the mobile system to move therewith, and thermally coupleable to the second cryogenic refrigeration system;
   a thermal coupler selectively operable to thermally couple the first cryogenic refrigeration system to the mobile system when the mobile system is coupled to the dock.

2. The system of claim 1 wherein the at least one quantum computing subsystem includes a superconducting quantum processor.

3. The system of claim 1 wherein the mobile system further comprises:
   a mobility subsystem mechanically coupled to the mobile system and controllably operable to propel and steer the mobile system; and
   a navigation subsystem communicatively coupled to the quantum computing subsystem to receive one or more results from the quantum computing subsystem, and communicatively coupled to the mobility subsystem to provide one or more control signals to the mobility subsystem,
   wherein the one or more control signals are based, at least in part, on the one or more results.

4. The system of claim 1 wherein the mobile system further comprises a data extraction subsystem that extracts data from an external environment of the mobile system, wherein the quantum computing subsystem is communicatively coupleable to the data extraction subsystem to receive data from the data extraction subsystem, the quantum computing subsystem selectively operable to generate a result based, at least in part, on the data from the data extraction subsystem, the result selectively usable to influence a behavior of the mobile system.

5. The system of claim 1 wherein the dock system is stationary.

6. The system of claim 1 wherein the first cryogenic refrigeration system includes a continuously operable cryogenic refrigeration system and the second cryogenic refrigeration system includes a single-shot cryogenic refrigeration system.

7. A method of operation of a mobile system comprising a quantum computing subsystem and a single-shot cryogenic refrigerator, the method comprising:
   docking the mobile system to a dock system comprising a dock, a first cryogenic refrigeration system, and a thermal coupler;
   thermally coupling the first cryogenic refrigeration system to the mobile system via the thermal coupler;
   cooling the quantum computing subsystem by the first cryogenic refrigeration system to provide an operating temperature of the quantum computing subsystem;
   disengaging the mobile system from the dock system;
   cooling the quantum computing subsystem by the single-shot cryogenic refrigerator to maintain the operating temperature of the quantum computing subsystem.

* * * * *